Patented Apr. 1, 1941

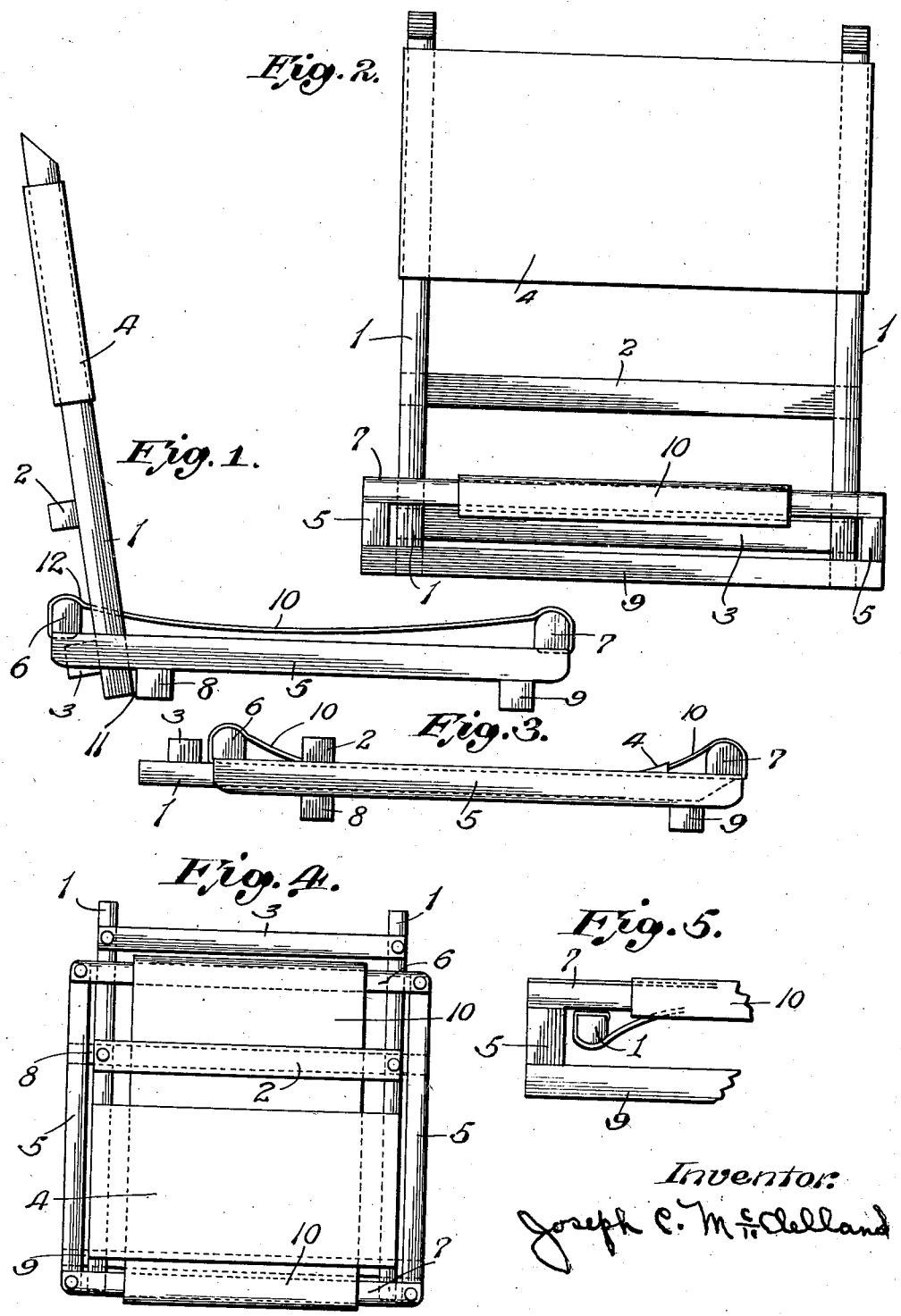

2,237,188

UNITED STATES PATENT OFFICE 2,237,188

FOLDING BACK WITH SEAT

Joseph Creig McClelland, Oklahoma City, Okla.

Application February 2, 1939, Serial No. 254,185

1 Claim. (Cl. 155—153)

This invention relates to new and useful improvements of a folding back with seat; and the objects of the improvements are, First, to provide a light, comfortable, portable, folding back with seat to be used in boats, porches, beaches, stadiums, amphitheaters, grandstands, or any place where a back with seat is desirable. Second, to provide a well braced, durable, water proof back with seat which will be cheap to manufacture, easy to carry, or store, and attractive in appearance.

I have accomplished the above, and other objects which will hereinafter appear, by means illustrated in the accompanying drawing which forms part of this specification in which Fig. 1 is a side view of my invention with back raised.

Fig. 2 is a front view with the back raised.

Fig. 3 is a side view with the back folded into seat.

Fig. 4 is an upper view with the back folded into seat.

Fig. 5 is a fragment of front view with back folded into seat.

Like characters of reference indicate like parts in the several views of the drawing.

The back consists of two back side standards 1—1, tapered slightly from base to top.

Number 2 is an upper back cross member which is screwed, or riveted, at the ends to the rear of the back side standards 1—1, and 4½ inches from the base of the back side standards 1—1. This puts the upper back cross member 2 low enough on the back so the occupant's back does not touch it when the invention is in use, and still spaced far enough from the lower back cross member 3 to permit the top rear seat cross member 6 to lie between the upper back cross member 2 and the lower back cross member 3 with the necessary inch or so of space for play in opening and closing the back. The upper back cross member 2 is a brace for the back side standards 1—1.

Number 3 is a lower back cross member which is screwed, or riveted, at the ends to the rear of the back side standards 1—1 about ⅝ inch from the base of the back side standards 1—1 so that the lower back cross member 3 is just under the top rear seat cross member 6 when the back is raised for use. The lower back cross member 3 is also a brace for the back side standards 1—1. The lower back cross member 3 keeps the back side standards 1—1 from slipping up from behind the lower rear seat cross member 8 while the invention is in use. The lower back cross member 3 protects the occupant's back from the feet behind if used in stadiums. The lower back cross member 3 holds the back and seat together by coming in contact with the seat canvas 10 if the back is pulled up between the top rear seat cross member 6 and the lower rear seat cross member 8.

Number 4 is the back canvas, or other suitable material, stretched and rolled across the front of the back side standards 1—1 and 1 inch from the top of the back side standards 1—1, and tacked on inside of the back side standards 1—1. The back canvas 4 forms a comfortable support for the back of the occupant, and is another brace for the back side standards 1—1.

The seat consists of two seat side standards 5—5, with the edges and corners rounded.

Number 6 is the top rear seat cross member with the edges and corners rounded and is screwed, or riveted, at each end to the top rear ends of the seat side standards 5—5. The top rear seat cross member 6 is a brace for the seat side standards 5—5 and supports one end of the seat canvas 10. The top rear seat cross member 6 acts as a stop for the rear of the back side standards 1—1 at point 12 when the invention is in use. The top rear seat cross member 6 keeps the back of the invention from slipping up from behind the lower rear seat cross member 8 when the invention is in use by coming in contact with the lower back cross member 3. The top rear seat cross member 6 holds the back of the invention in place when the back is folded.

Number 7 is the top front seat cross member with the edges and corners rounded, and is screwed, or riveted, at each end to the top front ends of the seat side standards 5—5. The top front seat cross member 7 is a brace for the seat side standards 5—5 and supports the other end of the seat canvas 10. The top front seat cross member 7 holds the back side standards 1—1 in place when the invention is folded.

Number 8 is the lower rear seat cross member and is screwed, or riveted, at each end to the lower sides of seat side standards 5—5 and 2½ inches from the rear ends of the seat side standards 5—5. The lower rear seat cross member 8 acts as a stop for the lower front edge of the back side standards 1—1 at point 11 while the invention is in use. The place where the lower rear seat cross member 8 is attached on the seat side standards 5—5 determines the pitch of the back of the invention. The lower rear seat cross member 8 is also a brace for the seat side standards 5—5. The lower rear seat cross member 8 supports the invention and can be used as a handle.

Number 9 is the lower front seat cross member, with the edges and corners rounded, and is screwed, or riveted to the lower sides of the seat side standards 5—5, and 1½ inches from the front end, or on the front end, of the seat side standards 5—5. The lower front seat cross member 9 is a brace for the seat side standards 5—5. The lower front seat cross member 9 also supports the invention and can be used as a handle.

Number 10 is the seat canvas, or other suitable material, with one end tacked and rolled over the top and in the center of the top front seat cross member 7. The other end runs between the back side standards 1—1, the upper back cross member 2, and the lower back cross member 3, is stretched tight, rolled over the top of rear seat cross member 6, then tacked on the inside to the center of the top rear seat cross member 6. The seat canvas 10 connects the back with the seat if the back is pulled up between the top rear seat cross member 6 and the lower rear seat cross member 8. The seat canvas 10 supports the body of the occupant at the proper height and makes a light, comfortable, form fitting seat. The seat canvas 10 also holds the back in place when the invention is folded.

It is important to have the top sides of the top rear seat cross member 6 and the top front seat cross member 7 over which the seat canvas 10 is rolled, between 2½ inches and 3 inches high from the under side of the lower rear seat cross member 8 and the lower front seat cross member 9 to allow for the stretching of the seat canvas 10 when sat upon, so that the seat canvas will support the body, and still not be so high that the feet have no support if the invention is placed on something high and used by a short person.

The back side standards 1—1 go in between the seat side standards 5—5, with the seat canvas 10 running between the back side standards 1—1, the upper back cross member 2, and the lower back cross member 3, attached to the top rear seat cross member 6 at one end and the top front seat cross member 7 at the other end. While the invention is in use the lower back cross member 3 comes just under the top rear seat cross member 6 with the lower ends of the back side standards 1—1 resting on the concrete, or whatever else the invention is placed upon. The lower front edges of the back side standards 1—1 are stopped by the lower rear seat cross member 8 at point 11 while the rears of the back side standards 1—1 are stopped by the top rear seat cross member 6 at point 12.

The occupant can rock back in the invention until the lower back ends of the seat side standards 5—5 come in contact with whatever the invention is placed upon. The lower back cross member 3 and the top rear seat cross member 6 prevent the ends of the back side standards 1—1 from slipping out from behind the lower rear seat cross member 8 when the invention is in use by coming in contact with each other. The weight of the body on the seat canvas 10, causing a forward pull on the top rear seat cross member 6 is partly counteracted by the weight of the back of the occupant on the back side standards 1—1, which causes a backward pressure on the top rear seat cross member 6 at point 12.

To fold the invention for carrying, or storage, push the upper part of the back forward and down, lifting the rear of seat slightly, permitting the lower back cross member 3 to slip out backward from under the top rear seat cross member 6 to a position behind the top rear seat cross member 6. The back side standards 1—1 fit along the inside of the seat side standards 5—5 and the back canvas 4 folds across the seat canvas 10. Then push the lower back cross member 3 and the top front seat cross member 7 toward each other, causing the upper ends of the back side standards 1—1 to slip under the top front seat cross member 7. The top rear seat cross member 6, the top front seat cross member 7, the back canvas 4, and the seat canvas 10 hold the back of the invention in place when folded.

It is understood that the form of my invention herein shown and described is to be taken as a preferred example of the device and that certain changes in the shape, size, and arrangements of the parts may be made without departing from the spirit of the invention, or the scope of the subjoined claim.

Having thus fully described my invention, what I claim is:

A folding back with seat construction comprised of a pair of seat side standards, a top rear seat cross member on the top at the rear ends of said seat side standards, a pair of back side standards being interposed between said seat side standards in front of said top rear seat cross member so as to rest against said top rear seat cross member when in use, a lower rear seat cross member on the bottom toward the rear of said seat side standards and against the rear of which the lower front ends of said back side standards abut when in use, a top front seat cross member on the top at the front ends of said seat side standards, a seat strip of suitable fabric with one end attached to said top front seat cross member and the other end run between said back side standards and attached to said top rear seat cross member, a lower back cross member placed sufficiently low on the rear of said back side standards as to just fit under said top rear seat cross member when the back is in use, an upper back cross member placed sufficiently low on the rear of said back side standards that the occupant's back does not touch it when the back is in use and still sufficiently far from the said lower back cross member to permit said top rear seat cross member to lie between said back cross members with the necessary space for play of said top rear seat cross member when opening and closing the back, a back strip of suitable fabric bridging said back side standards, placed so as to fold across said seat fabric and permit the upper ends of said back side standards to slip under said top front seat cross member when folding.

JOSEPH CREIG McCLELLAND.